United States Patent Office 3,337,590
Patented Aug. 22, 1967

3,337,590
CYANOMETHYLENE STEROID COMPOUNDS
Ajay K. Bose, Hoboken, and Robert T. Dahill, Jr., Perth Amboy, N.J., assignors to Research Corporation, New York, N.Y., a corporation of New York
No Drawing. Filed Mar. 9, 1965, Ser. No. 438,421
8 Claims. (Cl. 260—397)

This invention relates to steroid compounds. In one specific aspect, it relates to novel cyanomethylene substituted steroid compounds.

The steroids constitute a recognized class of compounds having a substituted tetracyclic perhydrocyclopenta[a]phenanthrene nucleus. Typical steroids exhibit several of the following general characteristics: the presence of some degree of unsaturation in the molecule, the presence of angular methyl groups at the 10- and 13-positions, the presence of a side chain at the 17-position, and the presence of an oxygen function such as hydroxy and keto at the 3-, 17-, and/or 20-positions. Many of the steroids occur in nature and possess important physiological activities.

The cyanomethylene steroid compounds of the present invention are made by the base-catalyzed reaction of a steroid ketone with a dialkyl cyanomethylphosphonate. The net result of the preparative reaction is the replacement of the carbonyl oxygen with the cyanomethylene group to yield the cyanomethylene compound corresponding to the reactant ketone. The cyanomethylene steroid compounds of the present invention exhibit desirable pharmacological activity when tested in animals and are useful intermediates in the synthesis of other steroids.

It is, therefore, a principal object of the present invention to provide a new class of pharmacologically-active and chemically-reactive steroid compounds characterized by the presence of one or more cyanomethylene substituents.

The novel compounds of the present invention are cyanomethylene steroid compounds wherein the cyanomethylene groups are present as substituents at positions selected from the group consisting of the 3-position, the 17-position and the 20-position. Included in these compounds are monocyanomethylene steroid compounds wherein the cyanomethylene group is present as a substituent at a position selected from the group consisting of the 3-position, the 17-position and the 20-position. Also included in these compounds are bis-(cyanomethylene) compounds wherein the cyanomethylene groups are present as substituents at positions selected from the group consisting of the 3-position and the 17-position, and the 3-position and the 20-position.

Conventional numbering of the positions in steroid compounds is illustrated by means of pregnanediol. The geometric or cis-trans configuration of the compound is not shown in the formula given below:

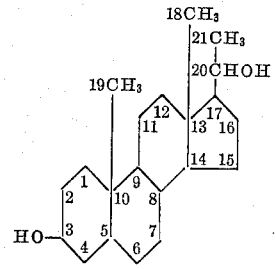

Pregnanediol is representative of the carbon skeleton found in pregnanedione and in the progesterone and cortisone series wherein the carbonyl oxygen is present at the 20-position or at the 3-position and the 20-position.

It is apparent from an inspection of the above formula that carbonyl oxygen cannot be present both at the 17-position and at the 20-position.

The well known sterol, cholesterol, is representative of the structure present in the cholestanone and coprostanone series. In these compounds, the oxygen function is present at the 3-position.

The sex hormones of the estrogen group, which includes estrone and equilenin, and of the androgen group, which includes testosterone and the androsterones, have the carbonyl oxygen at the 17-position or at the 3-position and the 17-position.

Steroids with alcohol groups in different positions are readily available from either chemical or microbiological transformations. Ketones derived by oxidation from these alcohols may also be utilized to prepare cyanomethylene steroid compounds.

The general preparative approach used to prepare the cyanomethylene steroid compounds of the present invention is to react a dialkyl cyanomethylphosphonate with a steroid ketone in a dry, preferably ethereal, solvent in the presence of a strong base catalyst. Other groups may be present in the reactant steroid ketone without interfering with the preparative reaction. Alkali-susceptible groups, such as the ester, may be saponified during the course of the reaction or during work-up of the reaction mixture.

Cyanomethylene substituted steroid compounds are chemically reactive and hence are useful in the synthesis of other steroid compounds. The cyano group is conjugated with the olefinic double bond and 1,4-reactions of the conjugated system as well as the individual reactions of the nitrile function and the olefinic double bond are possible.

Careful hydrolysis of the cyanomethylene steroid compounds of the present invention yields the corresponding unsaturated carboxylic acid. The olefinic double bond of the unsaturated acid may be reduced to yield the corresponding steroidyl acetic acid compound.

Esterification may be combined with the hydrolysis of cyanomethylene steroid compounds to yield the corresponding unsaturated esters. These esters are possible intermediates for the introduction of cortical side chains into the steroid molecule.

The reaction of diethyl cyanomethylphosphonate with 17-keto steroids is particularly interesting because the resulting compounds have the same carbon skeleton as progesterone and the related progestational hormones.

Our invention is further illustrated by the following examples. These examples are intended to be descriptive of the present invention and are not intended to limit its scope.

Examples

The following general method was employed in the preparation of the cyanomethylene steroid compounds of the present invention:

A solution of 3.6 grams of diethyl cyanomethylphosphonate in 20 milliliters of tetrahydrofuran was added dropwise, with stirring under nitrogen, to 1.1 grams of sodium amide in 25 milliliters of tetrahydrofuran. (The solvent was previously purified by distillation from lithium aluminum hydride.) The red solution was stirred for several hours with constant nitrogen flushing. To this solution was added 5.2 millimoles of the dry reactant steroid ketone in 100 milliliters of distilled tetrahydrofuran. After the addition was complete, the solution was stirred at room temperature for about fifteen hours. After evaporation of the resultant reaction mixture under reduced pressure, water was added to the residue and the mixture extracted with ether. After drying over sodium sulfate, the solvent was removed under reduced pressure leaving the crude product as the residue. The crude product was purified by solvent recrystallization.

Using the general method, cholestan-3-one gave a 71% yield of 3-cyanomethylene cholestane melting at 87–88° C.; 5α-androstane-3,17-dione gave an 86% yield of 3,17-bis-(cyanomethylene)-5α-androstane melting 202–4° C.; and dihydrotestosterone gave a 67% yield of 17β-hydroxy-3-cyanomethylene-5α-androstane melting 167–8° C.

Following the general method, pregnenolone acetate gave an 82% yield of 20-cyanomethylene-3β-hydroxy-5-pregnene melting 186–7° C. The 3-acetate group was hydrolyzed during the course of the reaction and/or work-up of the product.

Still using the general method, dehydroepiandrosterone gave a 67% yield of 17-cyanomethylene-5-androstene-3β-ol melting at 184–5° C.; estrone methyl ether gave an 84% yield of 3-methoxy-17-cyanomethylene-1,3,5(10)-estratriene melting at 184–5° C.; and 4-cholestene-3-one gave a 20% yield of 3-cyanomethylene-4-cholestene melting at 147–8° C.

Also prepared via the general method was 3-cyanomethylene-4-androsten-17β-ol from testosterone.

Representative cyanomethylene steroid compounds of the present invention were subjected to pharmacological evaluation and found to exhibit sedative activity at dosage ranges of 50–100 mg./kg. in the test animal. The resultant sedation was of several hours' duration.

We claim:
1. 3-cyanomethylene cholestane.
2. 3,17-bis-(cyanomethylene)-5α-androstane.
3. 17β-hydroxy-3-cyanomethylene-5α-androstane.
4. 20-cyanomethylene-3β-hydroxy-5-pregnene.
5. 17-cyanomethylene-5-androstene-3β-ol.
6. 3-methoxy-17-cyanomethylene-1,3,5(10)-estratriene.
7. The method of making mono- or bis-(cyanomethylene) steroid compounds of the cholestane, androstane, estrane and pregnane series wherein the cyanomethylene groups are present as substituents at positions selected from the group consisting of the 3-position, the 17-position and the 20-position which comprises reacting the corresponding steroid ketone with a dialkyl cyanomethylphosphonate in the presence of a strong base catalyst.
8. 3-cyanomethylene cholestene.

No references cited.

LEWIS GOTTS, Primary Examiner.

HENRY A. FRENCH, Assistant Examiner.